US011802371B2

(12) United States Patent
Cauquelin

(10) Patent No.: US 11,802,371 B2
(45) Date of Patent: Oct. 31, 2023

(54) HYBRID HOISTING CABLE, METHOD OF FORMING THE SAME, AND WINCH USING SUCH A CABLE

(71) Applicant: Reel, Saint Cyr Au Mont D'Or (FR)

(72) Inventor: Adrien Cauquelin, Lyons (FR)

(73) Assignee: Reel, Saint Cyr Au Mont d'or (FR)

( * ) Notice: Subject to any disclaimer, the term of this patent is extended or adjusted under 35 U.S.C. 154(b) by 590 days.

(21) Appl. No.: 16/950,082

(22) Filed: Nov. 17, 2020

(65) Prior Publication Data
US 2021/0156085 A1 May 27, 2021

(30) Foreign Application Priority Data

Nov. 22, 2019 (FR) .................................. 1913064

(51) Int. Cl.
*D07B 1/00* (2006.01)
*B66D 1/74* (2006.01)
*D07B 1/16* (2006.01)

(52) U.S. Cl.
CPC ............... *D07B 1/005* (2013.01); *B66D 1/74* (2013.01); *B66D 1/741* (2013.01); *D07B 1/162* (2013.01); *D07B 2201/1096* (2013.01); *D07B 2205/205* (2013.01); *D07B 2205/2014* (2013.01); *D07B 2205/2096* (2013.01); *D07B 2205/3025* (2013.01)

(58) Field of Classification Search
CPC ......... D07B 1/005; D07B 1/162; D07B 2201/1096; D07B 2205/2014; D07B 2205/205; D07B 2205/2096; D07B 2205/3025; D07B 1/0673; B66D 1/74; B66D 1/741
See application file for complete search history.

(56) References Cited

U.S. PATENT DOCUMENTS

| 4,217,748 A | 8/1980 | Fisher et al. | |
| 4,640,179 A * | 2/1987 | Cameron | D04C 1/12 87/8 |
| 9,175,437 B2 * | 11/2015 | Gamba | A62B 35/00 |
| 2010/0051890 A1 * | 3/2010 | Lauder | B64C 27/10 254/382 |
| 2011/0189411 A1 * | 8/2011 | Elad | D07B 1/025 385/100 |
| 2015/0050515 A1 * | 2/2015 | Gamba | D07B 1/005 428/608 |
| 2019/0119850 A1 * | 4/2019 | Erlendsson | D07B 1/16 |

FOREIGN PATENT DOCUMENTS

| CN | 105316967 A | 2/2016 | |
| EP | 3357858 A1 * | 8/2018 | ............ B66D 1/38 |
| GB | 2495975 A | 5/2013 | |
| TW | 451014 B | 8/2001 | |

OTHER PUBLICATIONS

Search Report issued in French Patent Application No. 1913064 dated Jul. 15, 2020.

* cited by examiner

*Primary Examiner* — Shaun R Hurley
(74) *Attorney, Agent, or Firm* — MARSHALL, GERSTEIN & BORUN LLP

(57) ABSTRACT

The invention concerns a hoisting cable formed of a steel core coated at its periphery with a textile sheath, wherein said textile sheath is a sheath directly braided on the steel core and made of an abrasion-resistant synthetic material.

17 Claims, 2 Drawing Sheets

[Fig. 1]
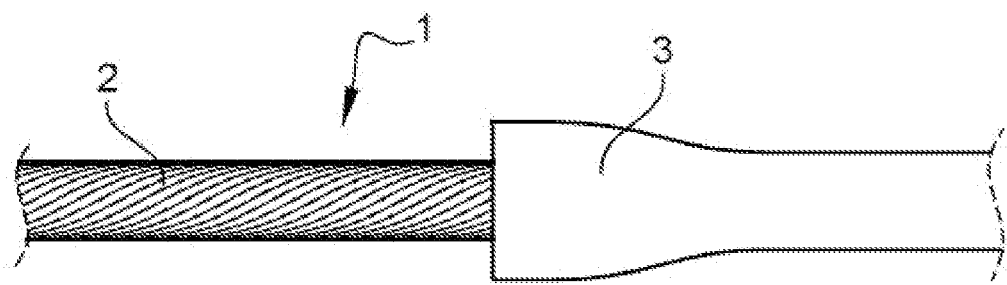
[Fig. 2]
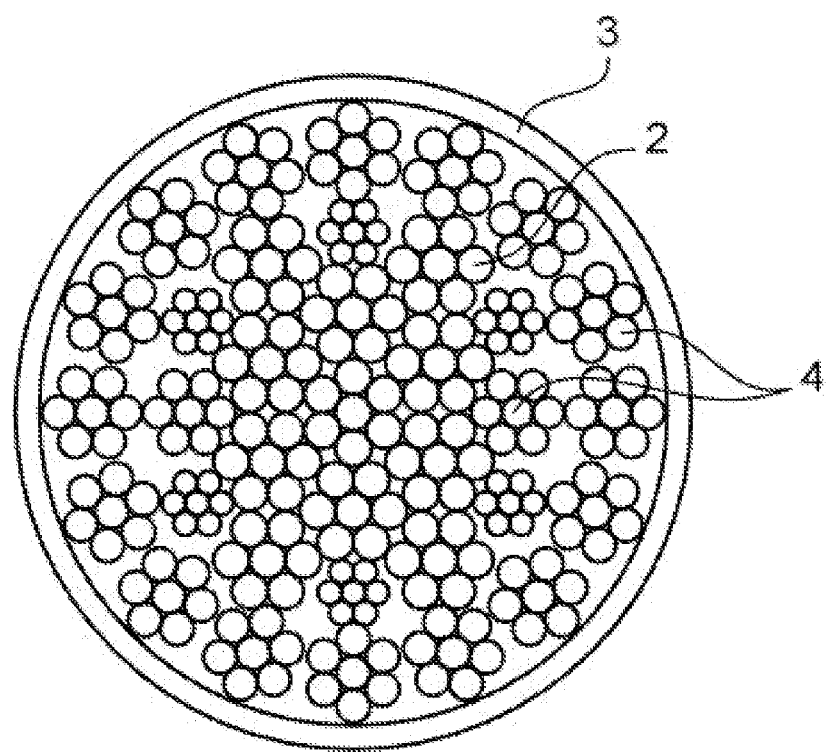

[Fig. 3]
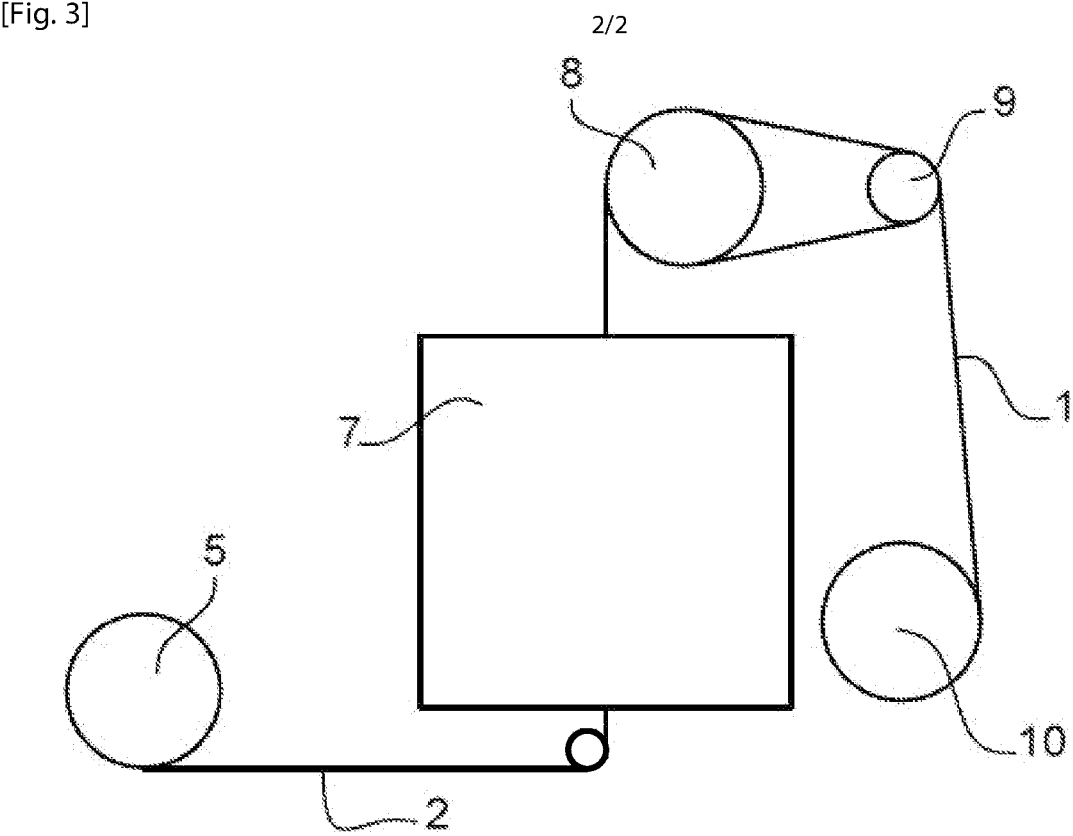
[Fig. 4]
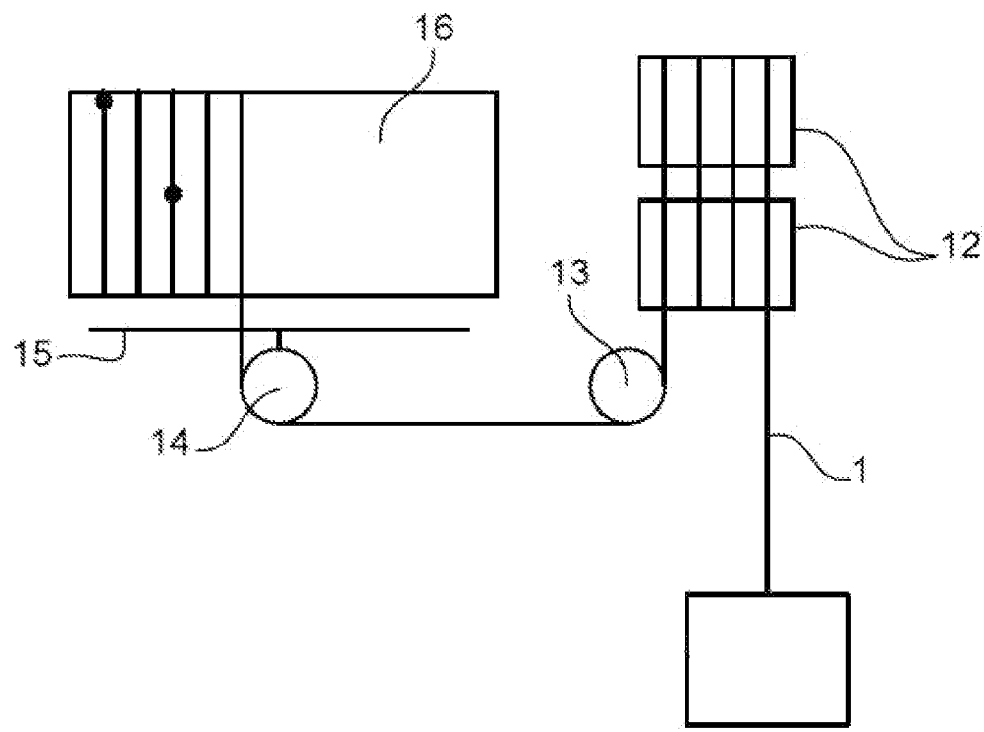

HYBRID HOISTING CABLE, METHOD OF FORMING THE SAME, AND WINCH USING SUCH A CABLE

DOMAIN OF THE INVENTION

The invention relates to the domain of hoisting cables. It more particularly aims at hoisting cables intended to be used in winches, be they conventional direct drum winches or so-called capstan winches.

BACKGROUND

In the domain of hoisting, it is known to use cables of high traction resistance, due to their destination. When, further, such cables are directly used with deflection elements, such as pulleys or a capstan, it is also desired for the cables to have a high flexion resistance, due to the many flexions or torsion to which they are submitted as a result of the winding or unwinding operations relative to a drum or a capstan.

For this purpose, steel stranded cables having this double characteristic have long been used. Each strand comprises a determined number of metal wires, and the cables are formed on appropriate machines to form layers. Such traction cables are meant to operate with a hoisting engine, particularly a winch, and are accordingly manipulated by the operators downstream of said hoisting engine.

Experience proves that along the use of such steel cables, even though the latter are stranded, the friction of the cable on the actual hoisting drum, or, in the context of a capstan winch, on the capstan itself, generates, due to the friction, a wearing of the metal wires forming the outer strands, which materializes by the occurrence at the cable periphery of a strand break, which is a criterion for the removal and the replacement of the cable.

Further, the use of such steel hoisting cables is a problem in the specific case of the use of capstan winches.

It should indeed be reminded that in capstan winches, the cable is submitted to friction phenomena generated by the sliding of said cable on the capstan drum(s) in the winding direction. Further, in a single-drum capstan, the cable is further submitted to a lateral sliding along the drum axis. Such a sliding generates a wearing of the wires forming the cable. However, in a double-drum capstan, phenomena of lateral sliding along the drum axis are suppressed, but an alternated flexion applies on the cable, which is folded and unfolded in the spacing between the drums at each winding. The contact pressure between the wires or strands of the cable and the drums in each cable folding area also generates an alteration of the cable integrity. Finally, the cable is submitted to torsion phenomena in the capstan which, at the contact surface between the wires or the strands of the cable and the capstan, results in friction and thus in a wearing of said cable.

Further, in the context of a helicopter winch cable, it is not unusual to observe shocks between the cable and outer obstacles capable of occurring in operation, here again capable of affecting the integrity of the cable.

To overcome these issues, it has been provided to coat such steel cables, for example, with PVC (polyvinyl chloride) or with polyamide. Such a coating may typically result from an extrusion operation. Even though such a coating increases the lifetime of the cables, it generates an extra thickness of the cable, thus increasing the generated bulk, particularly at the level of a storage drum, for example.

The principle of the sheathing of a steel cable by means of a textile structure, particularly for fireproofing purposes, is also known. However, such textile sheaths, while they effectively fulfill their primary function, that is, fireproofing, do not provide a sufficient adherence, and in any case a sufficient closeness to the steel cable to ensure a real protection of said cable.

The object targeted by the present invention is to overcome these various disadvantages, and particularly to secure any use of such a hoisting cable in the context of its use with a winch.

Thus, to overcome such sources of cable damage due to the contact on the drum of a winch or on a simple or a double drum of the capstan of a capstan winch, the invention provides covering the cable with a synthetic fiber braiding.

Tests performed on sheathed cables have shown that in case of an insufficient securing of the sheath to the cable, a sliding between the core of the cable and the sheath may occur over time and thus damage the sheath.

To avoid such a phenomenon, the invention provides a cable manufacturing mode where the synthetic fiber sheath is directly and tightly braided on the metal cable.

SUMMARY OF THE SPECIFICATION

For this purpose, the specification aims at a hoisting cable formed of a steel core coated at its periphery with a textile sheath, wherein said textile sheath is a braiding made of an abrasion-resistant synthetic material. More specifically, the invention aims at a hoisting cable used in a helicopter hoisting winch comprising at least one hoisting drum, said cable being formed of a steel core coated at its periphery with a textile sheath, wherein said textile sheath is a sheath directly braided on the steel core, and made of an abrasion-resistant synthetic material, wherein the average diameter of the steel core is in the range from 5 to 6 millimeters and wherein the thickness of the sheath is in the range from 3 to 10% of the cable diameter.

In other words, the invention comprises coating a conventional steel cable, and for example a prior art stranded cable, with a textile sheath obtained by braiding and made of an abrasion-resistant material having specific characteristics, particularly in terms of dimension. Thus, the thickness of the sheath is sufficient to ensure the protection of the steel cable, without too significantly altering the cable diameter.

Typically, the synthetic material used for the sheath is aramid. Other materials may however be used in the invention, among which HMPE ("High Modulus Polyethylene"), that is, a polyethylene of high molar mass, PBO (poly-p-phenylene benzobisoxazole), without for these mentions to be limiting.

The forming of the sheath around the steel cable by braiding has the advantage of resulting in a very close tightening of the sheath on the cable, enabling to avoid any risk of retraction or sliding of the sheath with respect to the cable, commonly called "sock" effect. In other words, the braiding thus performed of the sheath on the cable provides a greater physical integrity thereto, enabling to keep its basic mechanical properties (traction and flexion resistance), in addition to the external integrity of said cable while avoiding, due to the decrease of phenomena of cable friction on the hoisting engine and more particularly on the drum of a winch, and thus the premature wearing of the outer surface of the cable.

The use of such a sheath closely associated with the steel core enables to avoid the breakage of the outer strands of the steel cable, accordingly optimizing the conditions of use of such a cable by the winch operator, when the user of the winch is to be in contact with the hoisting cable.

Accordingly, the use of a material such as aramid, having mechanical traction resistance properties close to, or even greater than, those of steel, enables to contribute to the mechanical resistance of the cable.

Further, and according to an advantageous feature of the invention, this particular choice of textile material, due to its intrinsic characteristics, enables to use the hybrid cable thus obtained in relatively wide temperature conditions, typically from −150 to +200° C., which may be sought for specific applications.

Advantageously, a synthetic material, and particularly an anti-UV aramid, enabling to optimize the lifetime of such a cable, is used, it being understood that the latter is meant to be nearly systematically used outside, and thus submitted to solar radiations containing, in known fashion, UV rays.

According to an advantageous feature of the invention, the linear mass density of the ends forming the aramid sheath is comprised within a range from 800 to 1,700 dtex, to have a thickness of said sheath typically in the range from 3 to 10% of the cable diameter, as discussed hereabove.

According to an advantageous feature of the invention, the steel core is formed of a steel cable with anti-twist properties. As known, an anti-twist cable has reverse-stranded inner strands to provide the cable with a certain resistance to twisting.

According to the invention, the hybrid cable thus obtained is intended to be used within a conventional direct drum winch or a simple or double drum capstan winch on board a helicopter. As indicated hereabove, the particularity of a capstan winch generates flexions and torsions of the cable on the drums forming such a capstan. The use of the cable of the invention enables to limit wearing phenomena, conventionally observed on prior art winches.

The invention also aims at a hoisting device on board a helicopter, provided with a conventional winch or with a simple or double drum capstan winch using a cable according to the invention.

BRIEF DESCRIPTION OF THE DRAWINGS

The foregoing features and advantages of the present invention will now be discussed in the following non-limiting description of a specific embodiment, in relation with the accompanying drawings.

FIG. 1 is a simplified perspective representation illustrating the sheathed cable according to the invention.

FIG. 2 is a simplified cross-section representation of the cable of FIG. 1.

FIG. 3 illustrates the method of sheathing of the steel core by a braider according to the invention.

FIG. 4 is a simplified representation of a winch, particularly on board a helicopter using a capstan.

DETAILED DESCRIPTION

A simplified representation of the hoisting cable (1) according to the invention has thus been shown in relation with FIG. 1. Basically, the latter is formed of a steel core (2), in the case in point formed of strands (4) of metal wires with anti-twist properties. The used steel is a steel conventional for hoisting cables, providing said cable with both the traction and flexion resistance properties necessary for the envisaged application. Said core is selected according to the envisaged application, in the case in point a hoisting cable for a winch on board a helicopter.

Typically, in the application to hoisting devices on board a helicopter, the average diameter of the metal core (2) is close to 5 millimeters.

According to the invention, such a steel core is coated with a sheath (3) made in the described example of aramid by braiding. More particularly, the aramid used is for example commercialized under trade name Black Technora® (TEIJIN), which has the advantage of being UV-resistant. With a 5-millimeter diameter of the steel core (2), the thickness of the sheath (3) is close to 2/10 of a millimeter. Typically, the diameter of said cable is capable of varying between 5 and 6 millimeters, given the constraints to which it is submitted.

As already indicated, the aramid sheath is braided on the steel core (2), for example, by means of the installation schematically illustrated in FIG. 3. This representation is simplified and aims at better visualizing the path of the elements forming the hybrid cable (1).

More particularly, the steel core (2) is stored in the form of a coil (5), from which said core is pulled by means of a pulling capstan (8, 9), the concerned steel core transiting through a braider (7) intended to braid on the core (2) the aramid sheath of the invention.

In the case in point, the braider is for example of the type commercialized by companies RIUS, SPIRALTEX, HERZOG, or COBRA.

For example, the braiding is performed by means of 32 spindles in 1/1 assembly, using an aramid yarn of the previously-mentioned type of 1,670 decitex per spindle with no twisting.

Said braider uses a pumping stroke spring, capable of generating a strong tension of the aramid wires, to allow a tight sheathing of the aramid sheath (3) on the steel core (2). Such a tight sheathing is important, to enable to avoid any untimely motion, particularly of sheath sliding with respect to the steel core, and thus avoid the "sock" effect.

According to an invention, the braiding die for a hybrid cable intended for operations of hoisting by means of a winch on board a helicopter has a diameter close to 5 millimeters with a braiding pitch close 16 millimeters.

At the braider output, the hybrid cable (1) is for example stored on a reel or on a spool (10).

The hybrid hoisting cable resulting from this braiding operation keeps the traction and flexion resistance properties inherent to the actual metal core, and even optimizes them due to the specific choice of the textile fiber used for the braiding.

Further, such a sheath contributes to dissipating energy and thus to attenuating the bounce phenomenon in case of an abrupt breaking of the tensed cable, for example, as a result of a shock of said cable against an obstacle such as a tree, a building, etc. Thereby, the operator's security in particular is optimized. The sheath also contributes to increasing the protection of the actual steel cable in case of a shock with an obstacle of the type of those previously mentioned.

Further, the sheath provides the cable thus formed with a resistance to abrasion, particularly sought for when such a hoisting or traction cable is used with a winch-type hoisting device, of conventional direct drum or capstan type. Such a capstan winch is actually illustrated in FIG. 4.

Typically, in the described example, it is formed of a double capstan (12), having a cylindrical outer shell, rotated by means of motor (not shown) having the cable (1) according to the invention winding thereon. Such a double capstan ensures the effective traction of the cable.

Said cable is then stored on a storage drum (16) after passing, if present, on deflection pulleys (13, 14). The cable is wound in successive layers on said drum by means of a winding device (15), of self-reversing screw type, enabling, in known fashion, to displace the cable on the periphery of the storage drum along the winding, to form uniform winding layers.

Finally, the concerned sheath, due to its protective function, avoids the breakage of the outer ends of the steel strands forming the central core and thereby guarantees a greater security and a greater comfort for the operators of such winches.

The conventional drum winch or simple or double drum capstan winch using such a cable thus appears to be easier to use, with a lighter cable maintenance.

The invention claimed is:

1. A hoisting cable comprising:
    a steel core coated at its periphery with a textile sheath and configured to be coupled to a hoisting winch of a helicopter,
    wherein said textile sheath is a sheath directly braided on the steel core, and is made of an abrasion-resistant synthetic material,
    wherein an average diameter of the steel core is in the range from 5 to 6 millimeters, and
    wherein a thickness of the sheath is in the range from 3 to 10% of the cable diameter.

2. The hoisting cable according to claim 1, wherein the synthetic material forming the textile sheath is selected from the group comprising aramid, HMPE ("High Modulus Polyethylene"), and PBO (poly-p-phenylene benzobisoxazole).

3. The hoisting cable according to claim 2, wherein the synthetic material is provided with anti-UV properties.

4. The hoisting cable according to claim 1, wherein the steel core is provided with anti-twist properties.

5. The hoisting cable according to claim 1, wherein the linear mass density of strands forming the textile sheath is in the range from 800 to 1,700 decitex.

6. The hoisting cable according to claim 1, used in a single or double drum capstan winch.

7. A hoisting device comprising:
    a hoisting cable formed of a steel core coated at a periphery of the steel core with a textile sheath directly braided on the steel core and made of an abrasion-resistant synthetic material;
    a winch, configured for installation on a helicopter, and configured to wind and unwind the hoisting cable,
    wherein an average diameter of the steel core being in the range from 5 to 6 millimeters, and
    wherein a thickness of the sheath being in the range from 3 to 10% of the cable diameter.

8. The hoisting device according to claim 7, wherein the synthetic material forming the textile sheath is selected from the group comprising aramid, HMPE ("High Modulus Polyethylene"), and PBO (poly-p-phenylene benzobisoxazole).

9. The hoisting device according to claim 8, wherein the synthetic material is provided with anti-UV properties.

10. The hoisting device according to claim 7, wherein the steel core is provided with anti-twist properties.

11. The hoisting device according to claim 7, wherein the linear mass density of strands forming the textile sheath is in the range from 800 to 1,700 decitex.

12. The hoisting device according to claim 7, wherein the cable is used in a single or double drum capstan winch.

13. A hoisting device comprising:
    a hoisting cable formed of a steel core coated at a periphery of the steel core with a textile sheath directly braided on the steel core and made of an abrasion-resistant synthetic material,
    a single or double drum capstan winch, configured for installation on a helicopter and to wind and unwind the hoisting cable; and
    a storage drum for said hoisting cable,
    wherein an average diameter of the steel core being in the range from 5 to 6 millimeters, and
    wherein a thickness of the sheath being in the range from 3 to 10% of the cable diameter.

14. The hoisting device according to claim 13, wherein the synthetic material forming the textile sheath is selected from the group comprising aramid, HMPE ("High Modulus Polyethylene"), and PBO (poly-p-phenylene benzobisoxazole).

15. The hoisting device according to claim 14, wherein the synthetic material is provided with anti-UV properties.

16. The hoisting device according to claim 15, wherein the steel core is provided with anti-twist properties.

17. The hoisting device according to claim 14, wherein the linear mass density of strands forming the textile sheath is in the range from 800 to 1,700 decitex.

\* \* \* \* \*